United States Patent
Casati et al.

(10) Patent No.: US 7,155,720 B2
(45) Date of Patent: Dec. 26, 2006

(54) DYNAMIC TASK ASSIGNMENT IN WORKFLOWS

(75) Inventors: Fabio Casati, Palo Alto, CA (US); Silvana Castano, Milan (IT); Mariagrazia Fugini, Milan (IT)

(73) Assignee: Hewlett-Packard Development Company, L.P., Houston, TX (US)

( * ) Notice: Subject to any disclaimer, the term of this patent is extended or adjusted under 35 U.S.C. 154(b) by 884 days.

(21) Appl. No.: 10/032,893

(22) Filed: Oct. 26, 2001

(65) Prior Publication Data

US 2003/0149714 A1 Aug. 7, 2003

(51) Int. Cl.
  *G06F 9/46* (2006.01)
(52) U.S. Cl. .................. 718/104; 718/100; 718/102
(58) Field of Classification Search ............... 718/100, 718/102, 104; 705/1, 7–11
See application file for complete search history.

(56) References Cited

U.S. PATENT DOCUMENTS

| | | | |
|---|---|---|---|
| 5,937,388 A * | 8/1999 | Davis et al. ................... | 705/8 |
| 5,960,404 A * | 9/1999 | Chaar et al. ................... | 705/8 |
| 6,308,163 B1 * | 10/2001 | Du et al. ........................ | 705/8 |
| 6,424,948 B1 * | 7/2002 | Dong et al. ..................... | 705/9 |
| 6,601,082 B1 * | 7/2003 | Durham et al. ............. | 718/100 |
| 6,606,740 B1 * | 8/2003 | Lynn et al. ................. | 717/100 |
| 6,715,097 B1 * | 3/2004 | Kidder et al. ................... | 714/2 |
| 6,813,636 B1 * | 11/2004 | Bean et al. ................. | 709/226 |
| 6,895,586 B1 * | 5/2005 | Brasher et al. ............. | 719/313 |
| 6,917,975 B1 * | 7/2005 | Griffin et al. .............. | 709/225 |
| 2004/0162741 A1 * | 8/2004 | Flaxer et al. ................... | 705/7 |
| 2004/0172445 A1 * | 9/2004 | Singh et al. ................. | 709/200 |
| 2005/0002515 A1 * | 1/2005 | Mewhinney et al. ... | 379/266.08 |
| 2005/0154735 A1 * | 7/2005 | Breh et al. ..................... | 707/10 |

OTHER PUBLICATIONS

Bonifati et al. "Warehousing Workflow Data: Challenges and Opportunities." Proceedings of the 27th VLDB Conference, Sep. 2001.*
Bertino, E. et al. "A Flexible Model Supporting the Specification and Enforcement of Role-Based Authorizations in Workflow Management Systems" 2nd ACM Workshop Nov. 1997.
Sandu, R. "Separation of Duties in Computerized Information Systems" S. Jojodia and C. Landwehr, editors, Database Security IV: Status and Prospects, North-Holland, 1991.
Alturi, V. et al. "An Extended Petri-Net Model for Supporting Workflows in a Multilevel Secure Environment" 10th IFIP TC11/WG11.3 Int'l Conf. on Database Security, Italy 1996.
Sandu, R. "Task-Based Authorization: A Paradigm for Flexible and Adaptable Access Control in Distributed Applications" 16th NIST-NCSC Nat'l Computer Security Conference, 1993.
McCarthy, D. et al. "Workflow and Transactions in Inconcert" IEEE Data Engineering, 16(2):53-56, Jun. 1993.

* cited by examiner

*Primary Examiner*—Meng-AI T. An
*Assistant Examiner*—Lilian Vo

(57) ABSTRACT

A method of assigning resources to nodes in a workflow. In one embodiment, a plurality of nodes are defined. Each of the nodes is a task to be executed within the workflow. In the present embodiment, resources are defined to perform the execution of the nodes. In the present embodiment, a set of data items is stored. The stored data items comprise variables pertaining to workflow execution in the workflow. In the present embodiment, those defined resources are assigned to execute each of the nodes, according to a set of rules. In the present embodiment, the set of rules is for controlling the execution of the workflow.

24 Claims, 7 Drawing Sheets

DYNAMIC TASK ASSIGNMENT IN WORKFLOWS

FIELD OF THE INVENTION

The present invention relates to workflows. More particularly, the present invention relates to task assignment within a workflow in a dynamic manner.

BACKGROUND OF THE INVENTION

Workflow processes are complex activities involving the coordinated execution of several tasks by different executing agents, in order to reach a common objective. Workflow Management Systems (WfMSs) are software applications that support the specification, execution, and management of workflows. Workflow processes are inherently distributed, are cooperatively executed by a plurality of users and applications, and may span beyond organization boundaries.

Consequently, workflows are characterized by general security requirements of such kind of processes. Further, workflows present some peculiar security requirements that have to be considered, e.g., the assignment of tasks to agents (human or computer) in the system. The assignment of tasks is performed by the WfMS, (workflow management systems) according to properly defined models and rules. Properly defined rules are described in, for example, Bertino, E., et al., "A flexible model supporting the specification and enforcement of role-based authorizations in workflow management systems," Proceedings of 2nd ACM Workshop on Role-Based Access Control, Santiago Chile, November 1997.

However, a role-based model alone is insufficient to meet all the authorization requirements of the organization. In particular, it is well known in the arts that such policies often demand capabilities for expressing and enforcing authorization constraints, e.g., separation of duties constraint, such as those which are described in Sandhu R., "Separation of duties in computerized information systems," in S. Jojodia and C. Landwehr, editors, Database Security IV: Status and Prospects, North-Holland, 1991. Accordingly, more advanced role-based models are necessary, together with supporting technology, in order to enable the definition of authorization constraints in the WfMS, and to be able to implement the many different security policies of an organization.

A logic-based language for the specification and verification of authorization constraints in workflow systems, such as one described in (Bertino, 97, cited above) is used. Here, different types of constraints are introduced for workflows, based on a role-based access control model. Static, dynamic, and hybrid constraints are identified for consistency analysis purposes. Static constraints can be evaluated before workflow execution. Dynamic constraints can be evaluated only during workflow execution. Hybrid constraints are a combination of the two and can be partially evaluated without executing the workflow.

Access control models have been recently proposed specifically for workflows. For example, in Alturi V. et al., "An extended petri-net model for supporting workflows in a multilevel secure environment," Proceedings of the 10th IFIP TC11/WG11.3 International Conference on Database Security, Como, Italy, September 1996, Chapman & Hall, one type of workflow authorization model is defined so that the authorization flow is synchronized with the activity flow. This model is based on the concept of "authorization template" associated with each workflow task, to grant authorizations to a task only when the task starts, and revoke them when it terminates. Temporal authorizations are defined that have a validity only within the expected duration of a certain task.

To better cope with workflow requirements, the capability of specifying and enforcing authorization constraints is required to specify several organizational security policies on task execution and assignment. This can include task-based authorization models and separation of duties in computerized systems, both defined in the context of distributed applications. With task-based authorizations, such as one described in Sandhu R., "Task-based authorizations: A paradigm for flexible and adaptable access control in distributed applications," Proceedings of 16th NIST-NCSC National Computer Security Conference, Baltimore, Md., USA, 1993, authorizations are seen in terms of tasks rather than individual subject and objects. The concept of "authorization-task" is introduced as a unit to manage the authorizations in distributed applications, which can be refined into authorization-subtasks. The separation of duties constraint in computerized system, such as one described in Sandhu, R., 1991 (cited above), has been introduced where transactional control expressions have to enforce computerized controls analogous to the ones in manual, paper-based systems.

Although workflow management systems (WfMSs) have become very popular in recent years, and hundreds of commercial products presently exist on the market, it is only recently that the workflow community has started to address the problem of providing flexible authorization mechanisms. This is also motivated by the need for increased security imposed by cross-organizational interactions and by the use of workflows for supporting e-commerce transactions.

One product, such as IBM of Armonk, N.Y., USA product MQ Workflow as described in MQ Series Workflow—Concepts and Architectures, 1998, allows the definition of the binding of duties constraint: the executor of a task can be restricted to be the same executor of another task in the same case or to be the case initiator. Staffware2000, a product of Staffware Corporation of Maidenhead, Berkshire, United Kingdom which also enables the definition of the binding of duties constraint, although this must be statically defined, it holds for all instances, and cannot be defined in tasks that join flows from multiple tasks.

In addition, Staffware also allows the definition of authorizations that are valid only for a specified time period. Further, InConcert by InConcert Inc., a subsidiary of TIBCO Software Inc. headquartered in Palo Alto, Calif., allows, in addition to static binding of agents to tasks and of tasks to roles, the definition of external applications, that are invoked at task assignment time to determine the role to which the task should be assigned, as described in D. McCarthy et al., "Workflow and transactions in InConcert," IEEE Data Engineering, 16(2):53–56, June 1993.

COSA by Baan Company of The Netherlands, and as described in the COSA Reference Manual, 1998, is a commercial WfMS that provides the greatest flexibility in defining authorization constraints and task assignment criteria. COSA allows the definition of agent groups and group hierarchies, analogous to the role/level hierarchies presented in this paper, where authorizations can be inherited along the hierarchies. With respect to authorization constraints, COSA provides a simple language that enables the definition of the binding and separation of duties constraints and of time-dependent authorizations.

Changengine, by Hewlett-Packard of Palo Alto, Calif., and as described in Changengine Process Design Guide 2000, and in Changengine Resource Management Guide, 2000, is the commercial product with the richest and most flexible resource model. Task assignments are specified by a resource rule, executed each time a task is scheduled by the system. The rule, written in a Changengine-specific language, may invoke one or more methods on several business objects that encode the logic for agent selection. Such business objects, called it resource agents may, for instance, query a database or a lightweight directory access protocol (LDAP) directory in order to select the appropriate agent.

The above approaches have several limitations. They are less powerful in the class of time-, instance-, and history-dependent constraints they can model, allowing only the definition of a few types of constraints. Furthermore, the above approaches do not allow the definition of constraints that depend on the state of several workflow instances, and are incapable of managing global constraints, e.g., constraints applied to every task or case (for instance, a business policy may require that no agent executes the same task more than twice, regardless of the specific task or workflow).

Additionally, external applications or agent expressions, defined in order to determine the set of authorized agents, have to be computed each time a task is activated, rather than each time an authorization is modified, with resulting performance disadvantages.

Thus exists a need for a method to define coupled task assignment criteria and authorization rules within a workflow. Particularly, a need exists for specifying temporal, instance-based, and history-based authorizations. An additional need exists to provide a uniform and simple mechanism for easily specifying the different types of constraints. A further need exists for developing a mechanism to pre-compute the set of agents authorized to execute the tasks, so as to accelerate the execution of the workflow.

SUMMARY OF THE INVENTION

Accordingly, the present invention provides a method for dynamic task assignment in a workflow. In one embodiment, the present invention provides a method of assigning resources to nodes in workflow. In the present embodiment, the method is comprised of defining a plurality of nodes where each of the nodes are tasks to be executed. Further, the method of the present embodiment is further comprised of defining the resources authorized for the execution of each of the nodes. Additionally, the method of the present embodiment is further comprised of storing a set of data items which include variables pertaining to the workflow execution in the workflow. Also, the method of the present embodiment is further comprised of assigning the defined resources to the nodes for the execution thereof in accordance with a set of rules which are utilized to control the execution of the workflow. Pre-computed authorizations can be applied to the resources and wherein the authorizations are maintained in an up-to-date-manner, such that a set of authorized resources is retrievable concurrent with an initiated task.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

A method for dynamic task assignment in workflows is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

The present invention is discussed primarily in the context of a workflow as it relates to assigning tasks in a business process. However, it is appreciated that the present invention can be readily implemented in nearly all other types of processes that can be represented by and which can utilize workflows. It is further appreciated that the present invention can be used by most devices that have the capability to access some type of central device or central site.

Exemplary Electronic System

Figure 1:
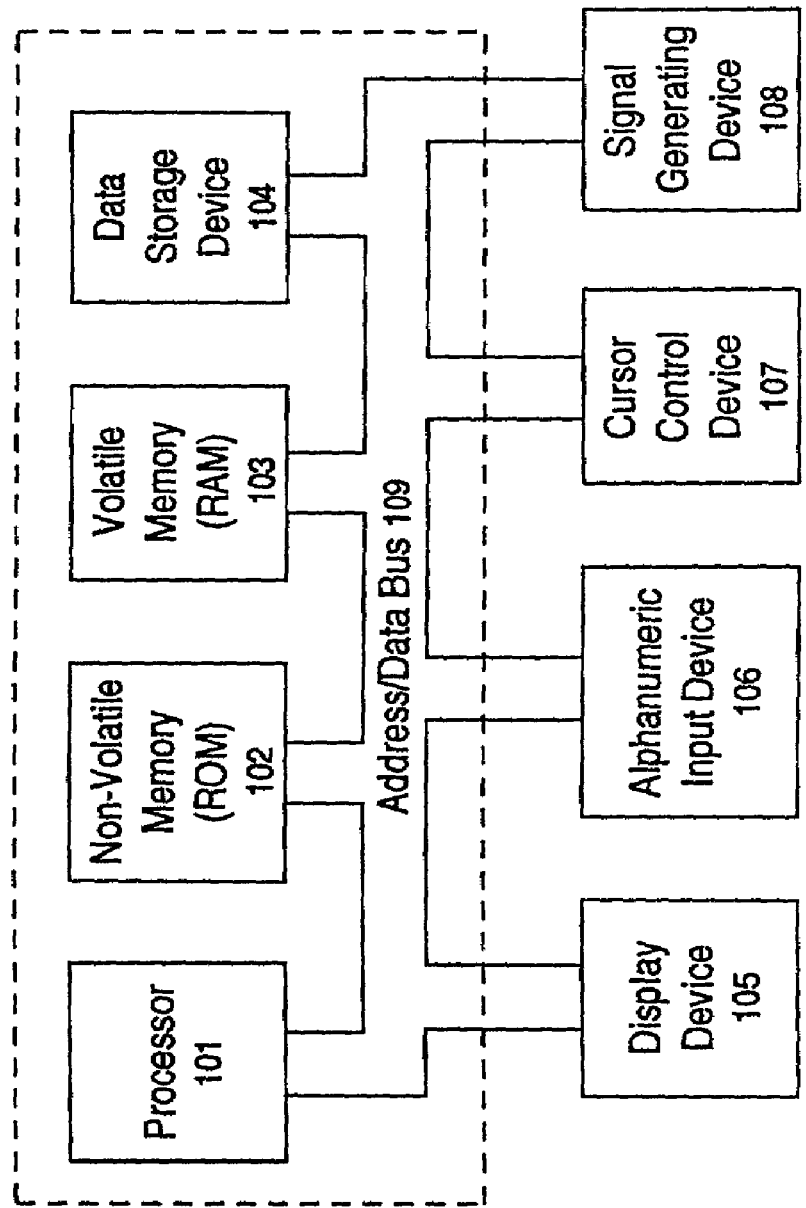
FIG. 1 is a block diagram of an exemplary computer system upon which embodiments of the present invention may be practiced

With reference to FIG. 1, portions of the present invention are comprised of computer-readable and computer executable instructions which reside, for example, in computer-readable media of an electronic system such as a computer system. FIG. 1 illustrates an exemplary electronic device 150 upon which embodiments of the present invention may be practiced. It should be appreciated that electronic device 150 of FIG. 1 is an exemplary representation of a number of different computer systems and electronic devices in which the present invention can operate, including but not limited to desktop computers, laptop computers, PDA's (personal digital assistants), cell phones, pagers, etc.

Electronic system 150 includes an address/data bus 109 for communicating information, a processor 101 coupled with bus 109 for processing information and instructions, a non-volatile (ROM—read only memory) 102 coupled with bus 109 for storing static information and instructions for processor 101, and a volatile memory (RAM—random access memory) 103 coupled with bus 109 for storing information and instructions for the processor 101. Electronic device 150 also includes data storage device 104 such as a magnetic or optical disk and disk drive coupled with bus 109 for storing information and instructions. Data storage device 104 can include one or more removable magnetic or optical storage media, e.g., diskettes, tapes, SD (secure digital) cards, MMC (multi-media cards), which are computer readable memories. Memory units of electronic device 150 include volatile memory 102, non-volatile memory 103, and data storage device 104.

Electronic device 150 of FIG. 1 can further include an optional signal generating device 108, e.g., a wired or wireless network interface card (NIC) coupled with bus 109 for interfacing with other computer systems and/or other electronic devices. Electronic device 150 can also include an optional alphanumeric input device 106 which includes alphanumeric and function keys coupled with bus 109 for communicating information and command selections to processor 101. An optional display device 105 can be coupled with bus 109 for displaying information to a computer user. Display device 105 may be a liquid crystal display (LCD), a cathode ray tube (CRT), another flat panel display, an electronic paper display, or other display device suitable for creating graphic images and alphanumeric characters recognizable to a user.

Electronic device 150 also includes an optional cursor control or directing device 107 coupled with bus 109 for communicating user input information and command selections to processor 101. Cursor control device 107 allows the user to dynamically signal the two dimensional movement of a visible symbol (cursor) on a display screen of display device 105. Many implementations of cursor control device 107 and know in the art including a trackball, mouse, optical mouse, touch pad, touch screen, joystick, or special keys on alphanumeric input device 106 capable of signaling movement of a given direction or manner of displacement. Alternatively, it is appreciated that a cursor can be directed and/or activated via input from alphanumeric input device 106 using special keys and/or key sequence commands.

Figure 2:
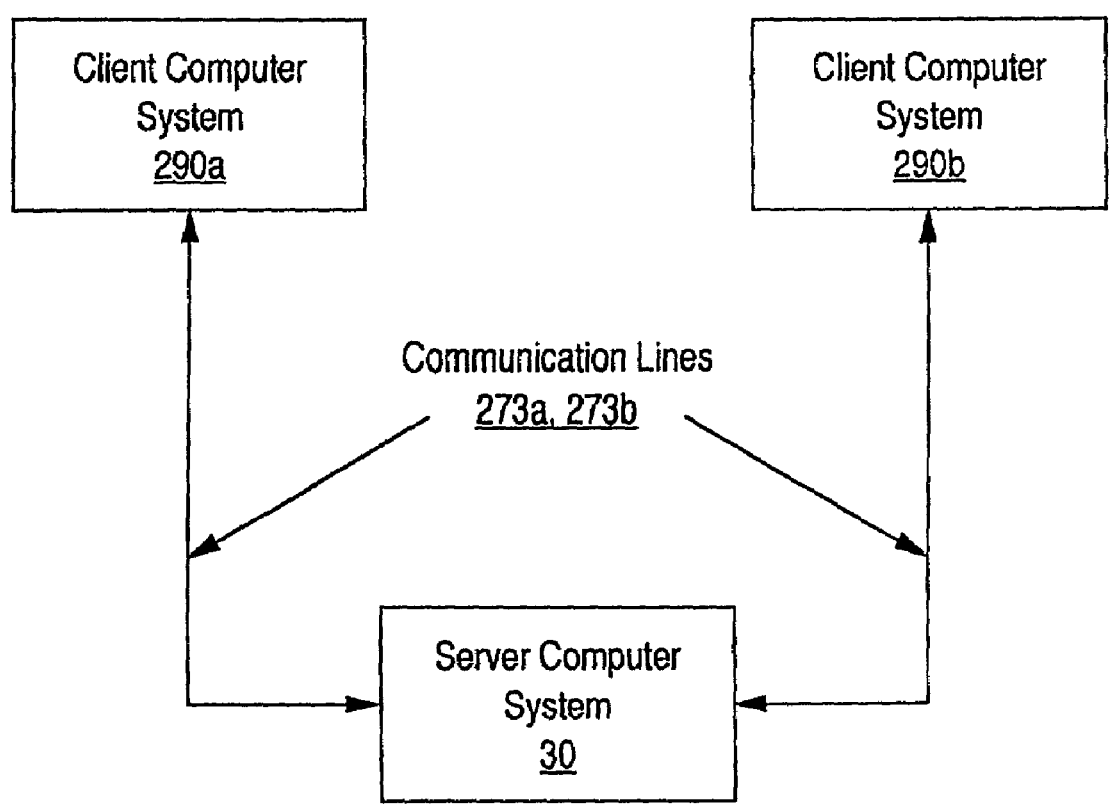
FIG. 2 is a block diagram of a client/server network environment upon which embodiments of the present invention may be practiced.

FIG. 2 is a block diagram illustrating an exemplary client-server computer system network 250 upon which embodiments of the present invention may be practiced. Network 250 may be a communication network located within a firewall of an organization or corporation (an "Intranet"), or network 250 may represent a portion of the World wide Web or Internet. Client (or user) computer systems 290*a* and 290*b* and server computer system 30 are communicatively coupled via communication lines 173*a* and 173*b*; the mechanisms for communicatively coupling computer systems over the Internet or over Intranets are well-known in the art. It should be appreciated that electronic system 150 of FIG. 1 can be implemented as a client computer systems, e.g., client computer system 290*a* or 290*b* of FIG. 2 or electronic system 150 can be implemented a server computer system 30, also of FIG. 2. This coupling can be accomplished over any network protocol that supports a network connection, such as IP (Internet Protocol), TCP (Transmission Control Protocol), NetBIOS, IPX (Internet Packet Exchange), and LU6.2, and link layers protocols such as Ethernet, token ring, and ATM (Asynchronous Transfer Mode). Alternatively, client computer systems 290*a* and 290*b* can be coupled to server computer 30 via an input/output port (e.g., a serial port) of server computer system 30; that is, client computer systems 290*a* and 290*b* and server computer system 30 may be non-networked devices. Though network 250 of FIG. 2 is shown to include one server computer system 30 and two client computer systems, 290*a* and 290*b*, respectively, it is appreciated that more than one server computer system 30 and more than two client computer systems can be used.

A workflow process definition, also commonly termed a workforce schema, is a formal representation of a business process. A workforce schema is composed of subprocesses and of elementary activities (tasks) that collectively achieve the business goal of that particular process. Activities (tasks) are organized into a directed graph (also termed a flow structure), that defines the order of execution among the activities (tasks) in the process. Within the directed graph, arcs may be utilized to indicate transition predicates defined over process data. This means that as an activity is completed, other activities related to the result of the first activity are executed when the corresponding transition predicate evaluates to true. A process instance or case in an enactment of a workflow schema. Further, a schema may be instantiated several times, and several instances may be concurrently running.

Figure 3:
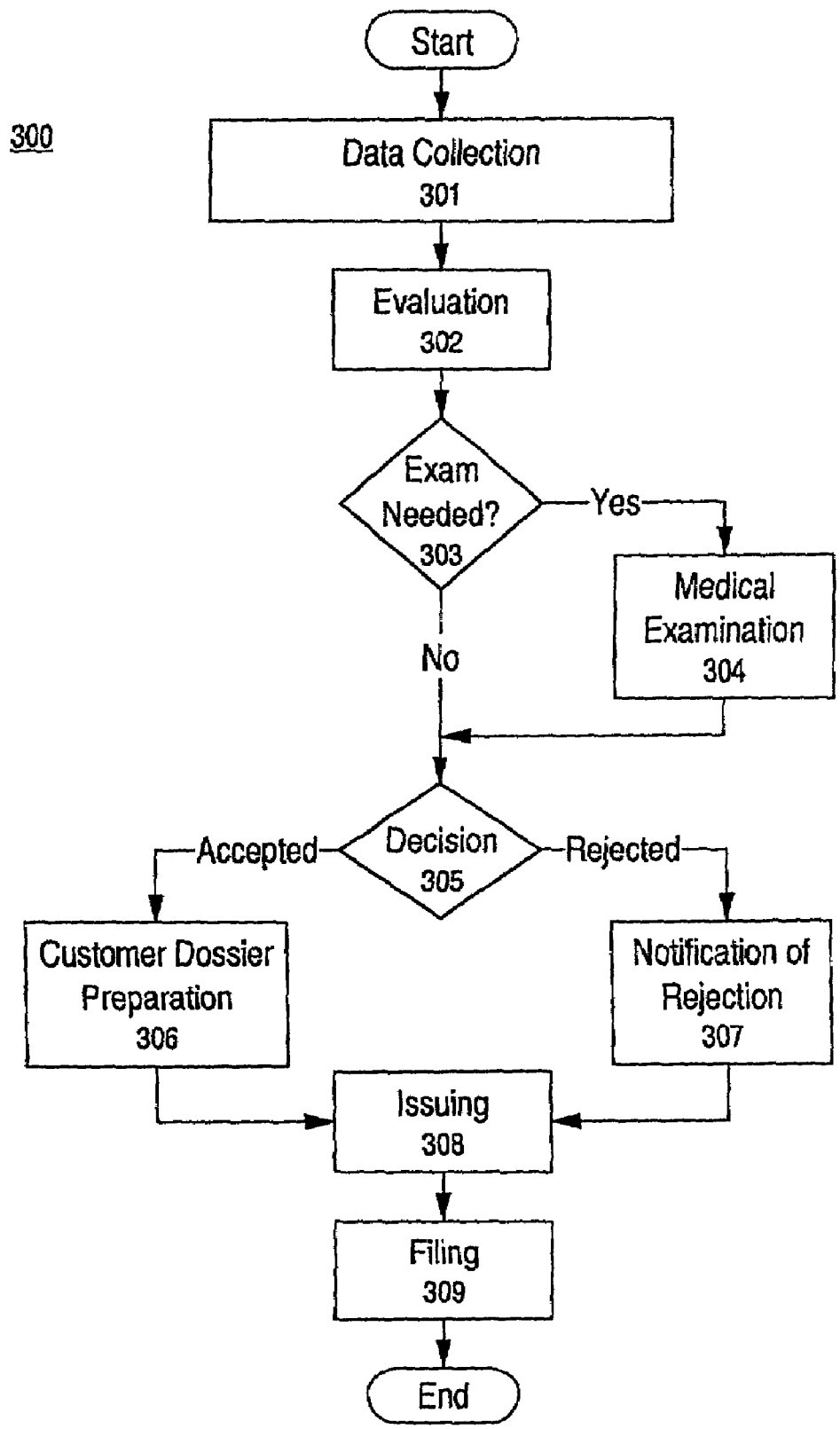
FIG. 3 is a diagram of a workflow process, in accordance with one embodiment of the present invention.

FIG. 3 is a basic workflow concept, according to the model and terminology defined by the Workflow Management Coalition (WfMC) as described in the following:

Hollingsworth, D., "The workflow reference model," in Technical Report WfMC-TC-1003, 1.1, Workflow Management Coalition, 1995;

The Workflow Management Coalition, Process definition interchange v 1.1. Technical Report WfMC-TC-1016-P, Workflow Management Coalition, 1999; and The Workflow Management Coalition, Terminology and Glossary, Technical Report WfMC-TC-1-11, 3.0, Workflow Management Coalition, 1999.

Referring to FIG. 3, an exemplary sample process related to the evaluation of a medical insurance request is depicted. An instance (or case) of workflow 300 is started as a new medical insurance request is received. In step 301 (data collection), data, such as customer's name, address, any symptoms, previous ailments, etc., are collected and inserted in electronic format. Subsequently, in step 302 (evaluation), that data is checked to determine whether a medical examination or medical advice is needed.

In one instance of the process, the case is routed (forwarded) to an insurance doctor who will, in step 303, perform a medical examination and prepare a medical report, based on the applicant's physical condition. Those results are then forwarded to the evaluation manager for the final decision, step 304, regarding the customer's request. In another instance, because a medical exam was not warranted, the request is forwarded directly to the evaluation manager for the final decision, step 305, regarding the customer's request.

Still referring to FIG. 3 and continuing, if the request is accepted, preparation of the customer's dossier (file), step 306, is completed. If, on the other hand, the customer's request is rejected, a notice of rejection, step 307, is forwarded to the customer, informing them of the decision. Both of these results are also examples process instances, as described above.

Subsequently, in step 308, insurance documents are issued and forwarded to the appropriate offices and department. Once these insurance documents are received by the respective offices and departments, the documents are filed, step 309.

It should be appreciated that although one example of present invention is described in the context of a medical insurance workflow, the present invention is well suited to be implemented in nearly any business process or environment where a business process can be represented in a workflow.

In workflow 300 of FIG. 3, the workflow process may create and access several types of data. The WfMC (workflow management coalition) has identified three common types of workflow data. The first is workflow relevant data which can include typed data created and used by a process instance. These data can be made available to subprocesses and activities, and can be accessed by the WfMS (workflow management system) in order to evaluate transition predicates. The second type of data identified by the WfMC are application data which is application specific and must be processed with external tools (e.g., Microsoft Word by Microsoft Corporation of Redmond, Wash.) and cannot be accessed by the WfMS, although the system may control and restrict accesses to them. The third type of data identified by the WfMC are system and environmental data, which are maintained by the local system environment or by the WfMS itself. System and environmental data can be utilized to evaluate transition predicates.

It should be appreciated that activities are typically executed atomically with respect to workflow relevant data, and data modifications are made visible as the task is completed.

Most WfMSs (workflow management systems) only provide basic functionality for the definition of workflow authorization models which typically allow for the definition of roles and levels, and enable the definition of play and execute authorizations that hold for all workflow instances.

Furthermore, roles and levels are often not structured in a hierarchy, thereby making authorization management more complex. However, a few products allow the definition of limited forms of instance-, history-, and time-dependent authorizations.

A critical issue in workflow management is the assignment of tasks and cases to the appropriate agent (also called a workflow participant), in order to execute activities or to supervise their actions. The most common approach adopted by most WfMSs consists of allowing the definition of an organization schema that describes the structure of the organization relevant to workflow management. In the organization schema, agents are grouped in several ways, e.g., in accordance with their skills or to which organizational unit they belong.

In the definition of the workflow schema, processes and activities are (statically) bound to elements of the organization schema, e.g., to roles or organizational units, rather than to individual agents. This approach decouples the definition of the process from the definition of the agents, and provides more flexibility, since changes of agents in the organization schema do not affect process definition.

At run-time, as a task is scheduled for execution, the WfMS determines all the agents allowed to execute it, and inserts the task into their worklists. As an agent, the task from his/her/its worklist in order to start working on it, the task is removed from the worklists of the other agents. For simplicity, we assume an organization model based on roles and agents; the extension to more complex organization models is straightforward.

A basic role-based authorization model, such as one described in R. Sandhu, et al., "Role-based access control models," IEEE Computer, 29(2):38–47, February 1996, is commonly adopted in most commercial and research workflow systems, to comply with organizational security policies. Often, these security policies express task assignment in terms of roles, e.g., job function or characteristics of the required application, instead of in terms related to specific individuals. Roles are job functions which describe the authority and responsibility conferred to the individuals that are assigned to them. According to this base model, authorization to execute tasks are associated with roles, and agents are authorized to play one or more roles. Assigning tasks in terms of roles reduces the number of authorizations necessary in the system and also simplifies the maintenance thereof. In one embodiment, this basic model framework is extended to include the concept of organizational level and authorization constraints.

Elements of the Framework

Figure 4:
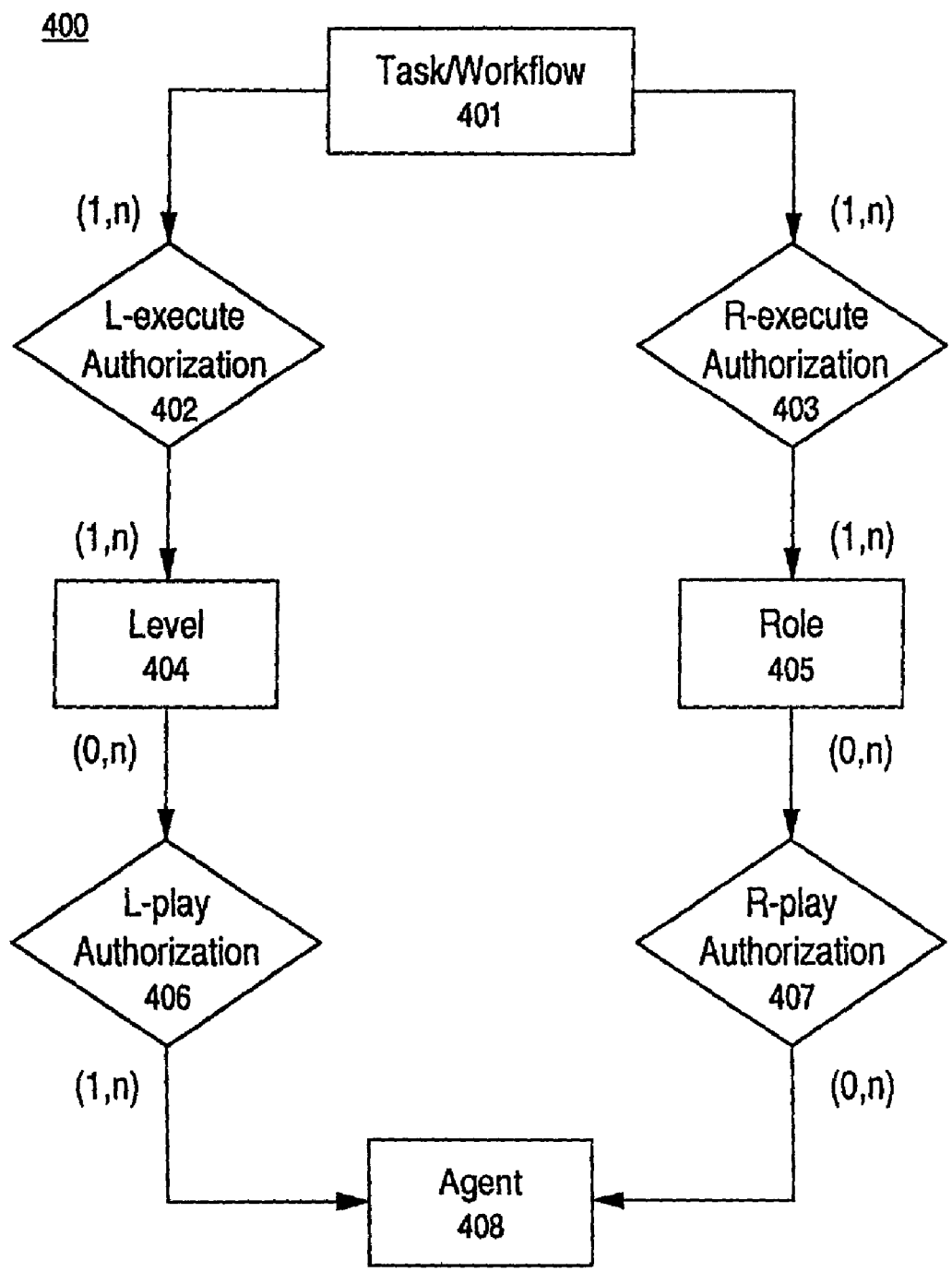
FIG. 4 is an illustration of elements in a workflow authorization model, in accordance with one embodiment of the present invention.

FIG. 4 depicts a workflow authorization model 400, in one embodiment of the present invention. Using the Entity-Relationship notation, workflow authorization model 400 considers agents and tasks, roles and organizational levels and authorizations.

Agents and Tasks

Agents and Tasks are the active entities of workflow 400 of FIG. 4, causing the data to flow among tasks or change the workflow system state.

Agent 408 denotes a processing entity of the organization to which tasks can be assigned for execution. Agent 408 can be a human user or an application. In one embodiment, the set of agents 408 in the workflow system is denoted by A.

Task 401 corresponds to an execution unit (node) of a workflow. In one embodiment, the set of tasks 401 in the workflow system is denoted by T.

Roles and Levels

Roles and levels are the organizational elements of the framework, describing capabilities of agents 408 to execute tasks 401 according to organizational assets.

A role represents a job function. In this example, the set of roles defined in the workflow system, (e.g., role 405) are denoted by R.

A level represents a functional level of the organization according to the organization chart. Examples of levels in a research lab are researcher, senior researcher, and lab director. In this example, the set of levels defined in the workflow system, (e.g., level 404) are denoted by L.

Figure 5A:
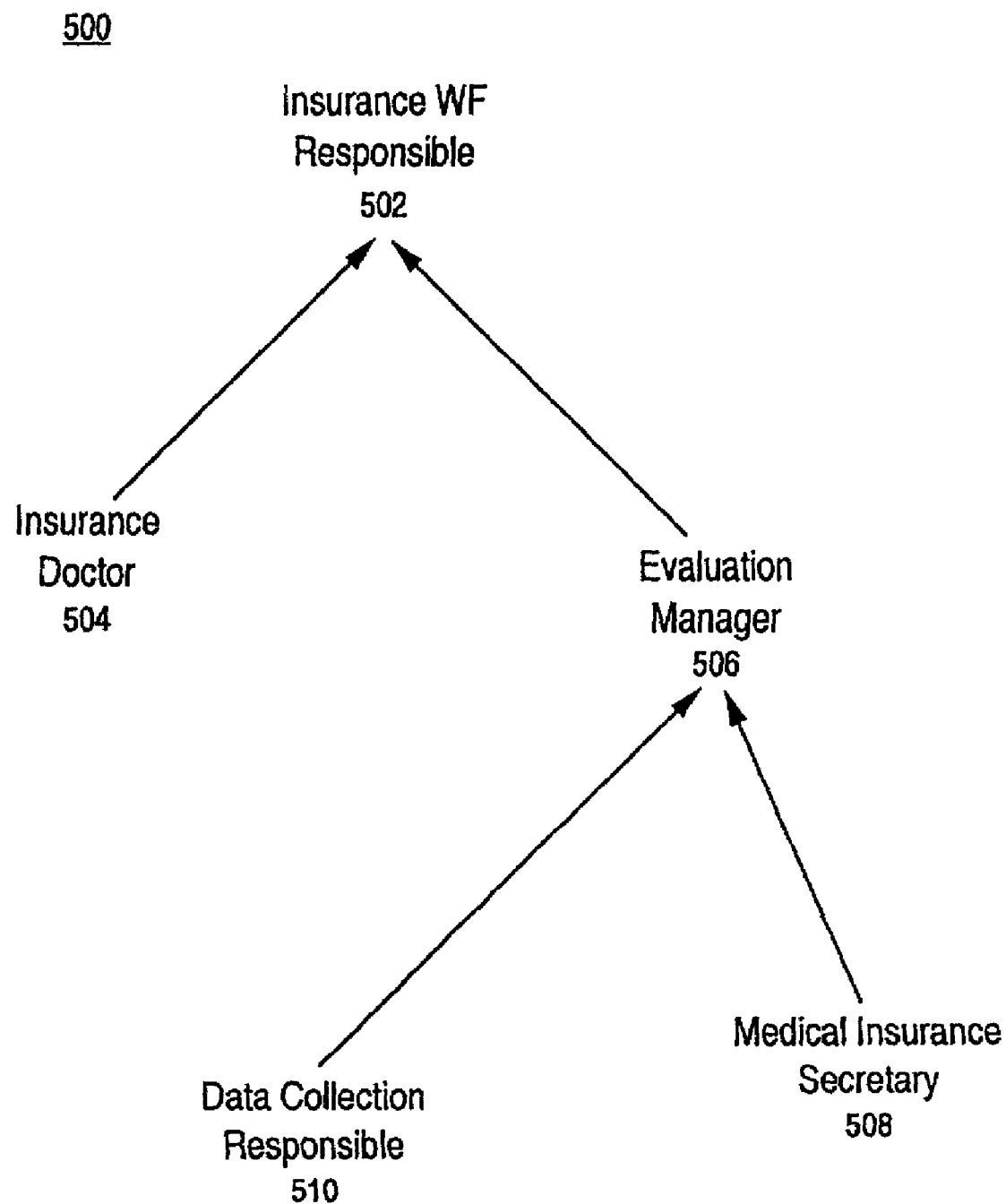
FIG. 5A is a illustration of a role hierarchy for the workflow of FIG. 3.

FIG. 5A is an example of role hierarchy for workflow 300 of FIG. 3. In one embodiment of the present invention, roles and levels are organized in hierarchies. The role hierarchy RH⊆(subseteq) R×R is a partial order relation on R, denoted by $\leq_R$, in one embodiment, and is also called the "role dominance" relation. Given r, r'∈R, $r \leq_R r'$ holds if r precedes r' in the order, graphically represented by an edge going from r' to r in the hierarchy.

For example, and with reference to FIG. 5A, evaluation manager 506 is shown as a parent to descendent data collection responsible 510. This is represented by evaluation manager $506 \leq_R$ data collection responsible 510. The role hierarchy for the workflow 300 implies inheritance of authorizations between roles. If $r \leq_R r'$, authorizations specified for r' (data collection responsible 510 in the present example) are inherited by r (evaluation manager 506 in the present example). Thus, evaluation manager $510 \leq_R$ medical insurance secretary 508. Further, insurance WF responsible $502 \leq_R$ insurance doctor 504 and evaluation manager 506 meaning that authorizations specified for both insurance doctor 504 and evaluation manager 506 are inherited by insurance WF responsible 502.

Figure 5B:
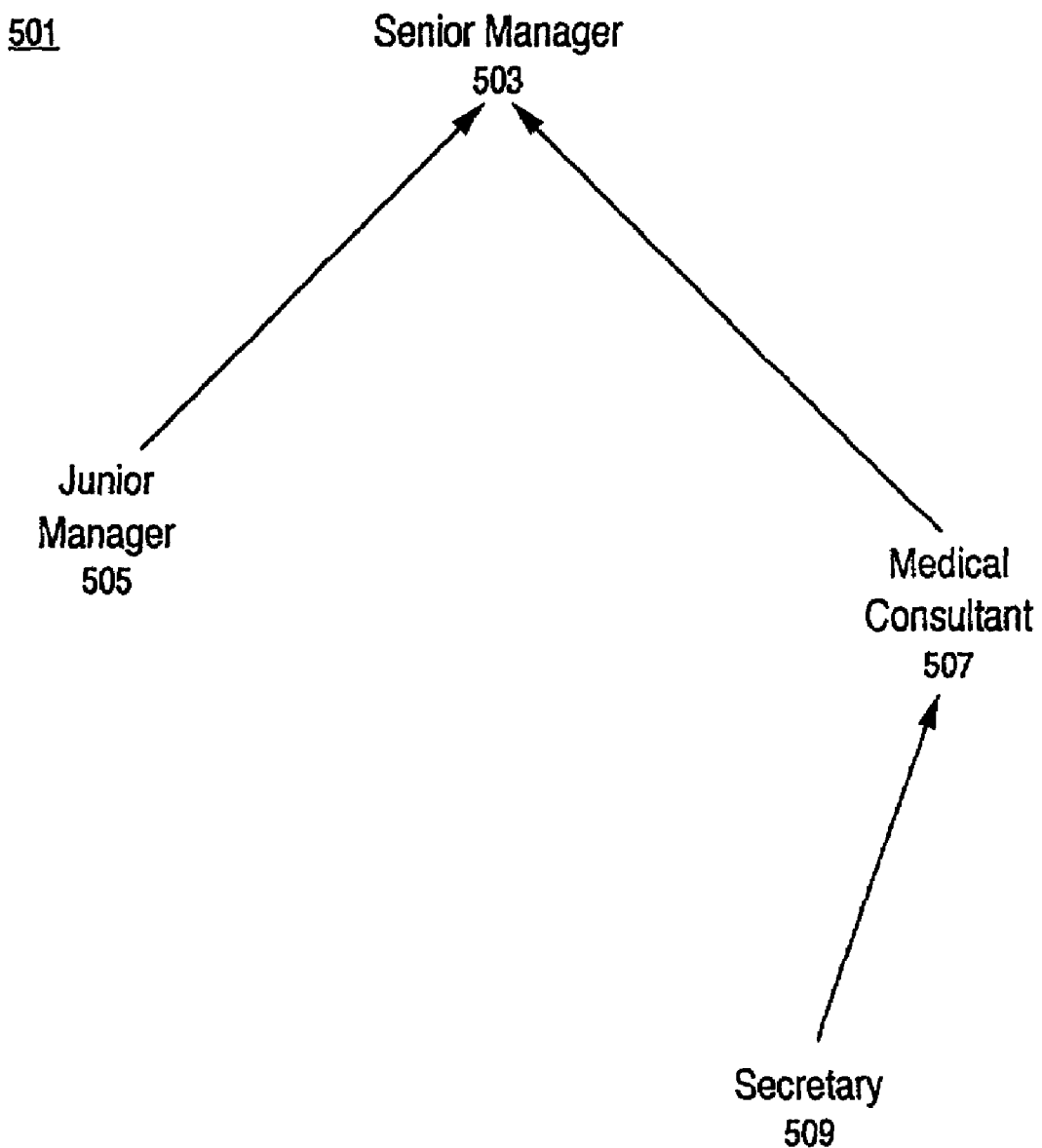
FIG. 5B is an illustration of an organizational level hierarchy for the workflow of FIG. 3.

Analogously, FIG. 5B is an example of level hierarchy for workflow 300 of FIG. 3. A level hierarchy LH⊆L×L, is defined for levels which is a partial order relation $\leq_L$ on L. Given I, I'∈L, I' holds if I precedes I'in the order. The graphical notation for the level hierarchy follows the same conventions of the role hierarchy as described in FIG. 5A. Accordingly, authorizations applied to secretary 509 (descendent) are inherited by medical consultant 507 (parent). It also follows that senior manager 503 inherits authorizations applied to junior manager 505 and medical consultant 507, and because secretary 509 is a descendent of medical consultant 507, senior manager 503 also inherits authorizations applied to secretary 509.

It should be appreciated that the availability of a hierarchical model also allows the definition of authorization rules based on X.509 certificates or LDAP (Lightweight Directory Access Protocol) directories that have a hierarchical structure analogous to that which is presented in one embodiment of the present invention. While the present invention is not designed for digital certificate support, in another embodiment, the present invention can be so configured.

It should also be appreciated that this embodiment of the present invention can be easily extended to other organizational structures different in form to the hierarchical one.

Authorizations

Authorizations define privileges for task assignment and execution. A task can be assigned only to agents that are authorized based on the role and level they have in the organization. To regulate task assignment, there are two kinds of authorizations which are to be considered, play authorizations and execute authorizations, in one embodiment of the present invention.

Play Authorizations determine the roles (R-play authorizations) and the levels (L-play authorizations) to which agents have to be assigned, e.g., R-play authorization 407 and L-play authorization 406 of FIG. 4, respectively. In one embodiment, the set of R-play and L-play authorizations are denoted by RPA and LPA, respectively. Further, the entire set of play authorizations defined in the workflow system are denoted by PA=RPA∪LPA.

Definition 1: R-play authorization:

An R-play authorization rpa ∈RPA is a triple; such that <a,play,r> where a ∈A and r ∈R, stating that agent a is assigned to role r. For example, authorization <John,play, Evaluation Manager> specifies that John is assigned to the Evaluation Manager role.

Definition 2: L-play authorization:

An L-play authorization lpa∈LPA is a triple; such that <a,play,l> where a∈A and l∈L, stating that agent a is assigned to level l. For example, authorization <Mary,play, Secretary > specifies that Mary is assigned to the Secretary level.

Execute Authorizations

Execute authorizations determine the tasks that roles (R-execute authorizations) and levels (L-execute authorizations) can execute in a workflow, e.g., R-execute authorization 403 and L-execute authorization 402 of FIG. 4, respectively. The set of R-execute and L-execute authorizations are denoted by REA and LEA, respectively. Further, the whole set of execute authorizations defined for the workflow system is denoted by EA=REA∪LEA.

Definition 3: (R-execute authorization):

An R-execute authorization rea∈REA is a triple; such that <r,execute,t> where r∈R and t∈T. An authorization <r,execute,t> states that role r is authorized to execute task t. For example, authorization <Evaluation Manager,execute, Evaluation> is a permission for role Evaluation Manager to execute the Evaluation task.

Definition 4: (L-execute authorization)

An L-execute authorization lea∈LEA is a triple; such that <l,execute,t> where l∈L and t∈T. An authorization <l,execute,t> states that level l is authorized to execute task t. For example, authorization <Secretary,execute,Issuing> is a permission for role secretary to execute the issuing task.

Accordingly, following conventional role-based authorization models, inheritance of execute authorizations occurs in role and level hierarchies, as described in FIGS. 5A and 5B. It should be appreciated that in one embodiment of the present invention, there is enablement to specify that a task should only be assigned based on explicit authorizations, and not based on derived (inherited) ones.

Authorizations inherited by a certain role/level are dynamically derived using the following derivation rules:

Rule 1 (R1): For any t∈T, op=execute
    if $r \leq_R r'$, then <r',execute,t>→<r,execute,t>

Rule 2 (R2): For any t∈T, op=execute
    if $l \leq_L l'$, then <l',execute,t>→<l,execute,t>

Consider medical insurance workflow 300 of FIG. 3 and the role and level hierarchies of FIGS. 5A and 5B. If authorization <Evaluation Manager,execute,Evaluation> is defined for role Evaluation Manager 506 (FIG. 5A), then authorization <Insurance WF Responsible, execute, Evaluation> is derived for role Insurance WF Responsible 502 (FIG. 5A) in accordance with Rule 1 (R1). Analogously, if authorization <Junior Manager, execute, Evaluation> is defined for level Junior Manager 505 (FIG. 5B), then authorization <Senior Manager, execute, Evaluation> is derived for role Senior Manager (FIG. 5B) in accordance with Rule 2 (R2).

Authorization Constraints

Authorizations in PAUEA constitute a "basic" set of authorizations capable of satisfying many security policies of an organization. In particular, associating authorizations with roles and levels has the advantage of reducing the complexity of authorization management, since the number of roles is smaller than the number of agents and it is not necessary to update authorizations when agents change position and duties in the organization. Authorizations in PAUEA are also of a static nature, that is, once they are defined, they apply to all instances of a workflow schema, in any instant of time, and independent of the activity execution history. Consequently, they are not flexible enough to capture all possible security policies of an organization on workflow execution, which need the capability of expressing and enforcing constraints.

Examples of constraints on workflow execution are the following:

"Two different roles/agents must execute two tasks, T1 and T2, in a given workflow WF" (separation of duties);

"The same role/agent must execute two tasks, T1 and T2, in a given workflow WF" (binding of duties);

"A role R can execute a task T in a given workflow WF only for a certain period of time (absolute time)" (restricted task execution);

"At the least K roles must be associated with a workflow WF in order to start its execution" (cooperation); and "A case is inhibited to all agents for a given period of time" (inhibition).

Constraints require the capability of specifying authorizations that are of dynamic nature, either because they are bound only to a specific workflow instance (e.g., the inhibition constraint above) or because they are time-dependent (e.g., the restricted task execution constraint) or because they are related to the activity execution status (e.g., the separation of duties constraint). To specify authorizations of dynamic nature and make the framework more advanced and compliant with organizational policies, authorization constraints are implemented in one embodiment of the present invention.

Figure 6:
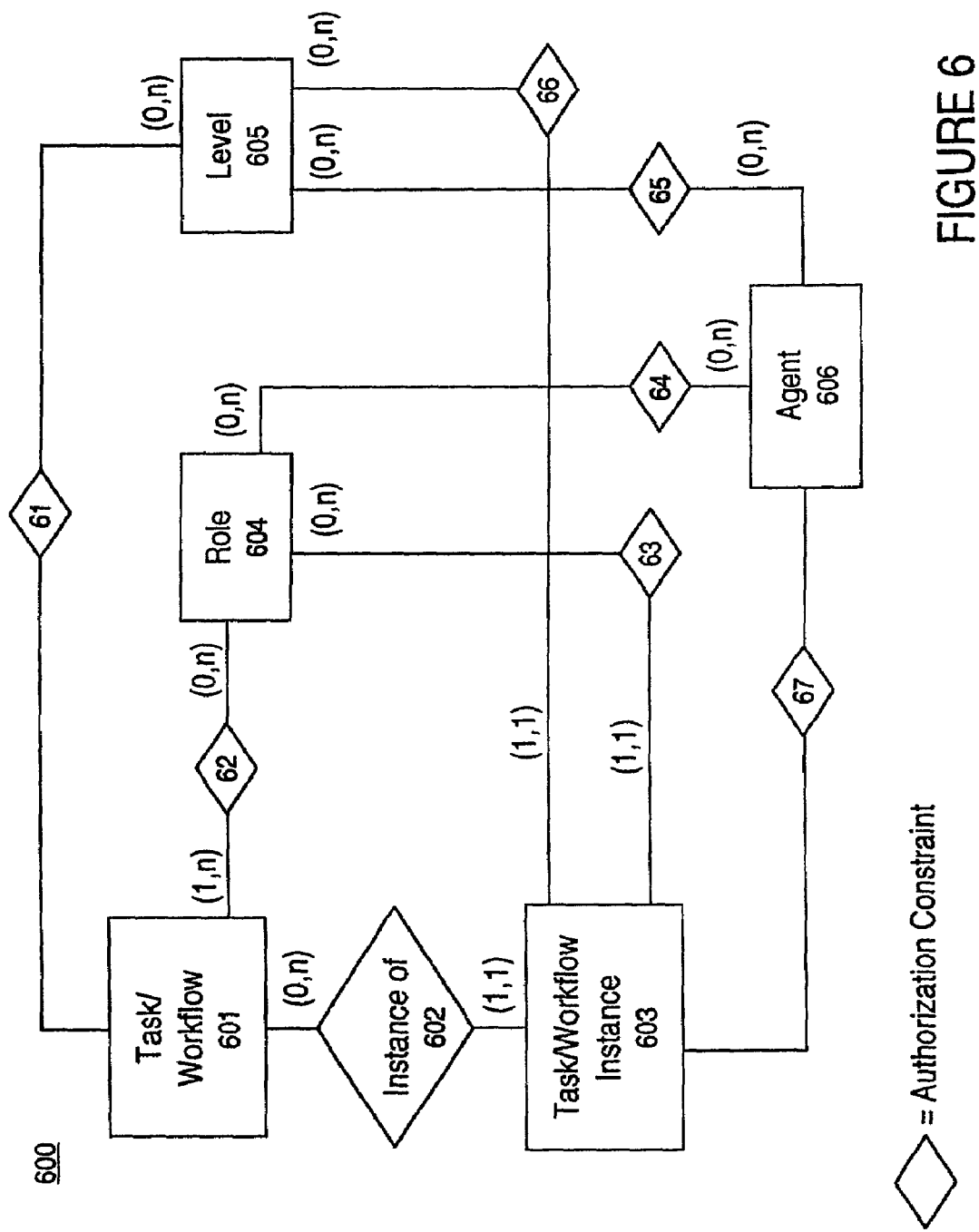
FIG. 6 is an illustration of an advanced workflow authorization model including authorization constraints, in accordance with one embodiment of the present invention.

FIG. 6 is an illustration depicting workflow authorization framework with authorization constraints. FIG. 6 shows the workflow authorization framework with authorization constraints, which are graphically represented as gray relationships. By means of authorization constraints, it is possible to specify instance, temporal, and history authorizations. For example, task workflow 601 is under constraint 61 with respect to level 605 and level 605 is under constraint 61 with respect to task workflow 601. Level 605 is also under constraint 65 with respect to agent 606 and agent 606 is under constraint 65 with regard to level 605, and so on.

Instance Authorization Constraints

Authorizations in PAUEA are defined at the workflow/task schema level, and are valid for all corresponding instances. An instance authorization constraint expresses an authorization that has validity only for specific workflow/task instances. To model instance authorizations, an entity named Task/Workflow instance is defined in the framework.

Temporal Authorization Constraints

Authorizations in PAUEA are always valid, independent of the time they are considered. A temporal authorization constraint expresses an authorization that has a validity limited in time. To model temporal authorizations, an attribute temporal validity is specified for authorization constraints.

History Authorization Constraints

Authorizations in PAUEA do not take into account information on past execution of activities in a workflow. A history authorization constraint expresses an authorization which depends on the status and execution history of the system at a certain point in time, during the activity flow execution (e.g., separation of duties for tasks). It is appreciated that, in one embodiment, the execution history is recorded by workflow management systems.

The set of authorization constraints defined in the workflow system is denoted by AC. Consequently, the set of authorizations that are defined in the system is given by PAUEAUAC. For the framework, the closed system assumption holds, that is, each task assignment operation is rejected unless an authorization for it is defined in PAUEAUAC. A workflow security administrator is responsible for granting and revoking authorizations in the system.

The above has outlined the main characteristics of authorization constraints for workflows. Some of the characteristics result in demanding requirements for an authorization constraint language and for the system implementation enforcing them. These requirements suggest the adoption of a rule-based approach to the definition and enforcement of authorization constraints. In fact, authorizations should be granted or revoked at the occurrence of specific events (e.g., specific points in time, modifications to system or workflow relevant data, activations of tasks or cases), and as certain conditions over system or workflow relevant data are verified (e.g., when a workflow relevant datum has a given, critical value).

Authorization Implementation PAUEAUAC using the active database technology.

Thus, a constraint may be described by an ECA (event-condition-action) rule, where:

the event part defines when new authorizations/prohibitions may need to be enforced (in addition to the ones of the reference model);

the condition part verifies that the occurred event actually requires the modification of authorizations, and determines the involved agents, roles, tasks, and cases; and/or the action part enforces authorizations and prohibitions.

It should be appreciated that ECA (event-condition-action) rules may be exploited for defining and enforcing authorization constraints. Additionally, ECA rules can also support derivation of authorizations in role and level hierarchies, to propagate authorizations defined for a given role (respectively, level) to (e.g., inherited by) its parents. Consequently, a derivation mechanism is necessary to derive propagated authorizations along the hierarchies. Further, ECA rules are a suitable paradigm for managing authorization derivation, and within one embodiment of the present invention, ECA rules can be adopted to implement the derivation mechanism.

Additionally, many commercial WfMSs (such as Changengine by Hewlett-Packard and MQ Workflow by IBM), and several research prototypes (such as WIDE) execute on top of an active database, that offers active rule definition and execution support.

Schema of the Authorization Base

Table 1, below, shows the schema of the authorization base, in terms of relations. In Table 1, underlined attributes of each relation denotes the primary key. For ease of description, assume that names of tasks, levels, and roles are unique within the WfMS.

TABLE 1

| | |
|---|---|
| RoleHierarchy | (Role, Parent) |
| LevelHierarchy | (Role, Parent) |
| R-Play | (Agent, Role) |
| L-Play | (Agent, Role) |
| R-Execute | (TaskName, Role, Type) |
| L-Execute | (TaskName, Role, Type) |
| Force | (TaskName, Case, Agent) |
| Revoke | (TaskName, Case, Agent) |

Relations RoleHierarchy and LevelHierarchy define the hierarchies of roles and levels, by specifying which are the parents of each role or level. The hierarchies are shared by all workflows. Note that the pair <Role, Parent> is the primary key, meaning that we allow multiple parents for each role or level as described in FIGS. 5A and 5B. These relations are populated as the organization schema is defined; relation RoleHierarchy is also typically updated as a new workflow schema is defined, since often new roles need to be introduced for the newly specified workflow. For instance, in the workflow system that includes the medical insurance workflow 300 of FIG. 3, Table 2 shows the authorization base relations for RoleHierarchy and Table 3 shows the authorization base relations for LevelHierarchy as follows:

TABLE 2

RoleHierarchy

| Role | Parent |
|---|---|
| Data Collection Responsible | Evaluation Manager |
| Medical Insurance Secretary | Evaluation Manager |
| Evaluation Manager | Insurance WF responsible |
| Insurance Doctor | Insurance WF responsible |

TABLE 3

LevelHierarchy

| Level | Parent |
|---|---|
| Secretary | Medical Consultant |
| Junior Manager | Senior Manager |
| Medical Consultant | Senior Manager |

Relations R-Play and L-Play define play authorizations. These relations are populated as the organization schema is defined; relation R-Play is also typically updated as new workflow schema is defined. In workflow system 300, the R-Play relations are shown in Table 4 and the L-Play relations are shown in Table 5 as follows:

TABLE 4

R-Play

| Agent | Role |
|---|---|
| Judy | Evaluation Manager |
| John | Insurance WF Responsible |
| ... | ... |

TABLE 5

L-Play

| Agent | Level |
|---|---|
| Brenda | Secretary |
| Mary | Secretary |
| Judy | Junior Manager |

Due to the close system assumption, only authorizations are stored, and the absence of an authorization is indicative of a prohibition.

Relations R-Execute and L-Execute defines execute authorizations. They are populated as a new workflow schema is defined, and can be later modified at the occurrence of specified events on time or workflow data. Attribute Type defines whether the authorization is explicitly specified for the role/level or if it has been derived by means of derivation rules. With reference to the workflow 300 of FIG. 3, Table 6, below, shows the R-Execute relations and Table 7, below, shows the L-Execute relations.

TABLE 6

R-Execute

| Task Name | Role | Type |
|---|---|---|
| Data Collection | Data Collection Responsible | explicit |
| Evaluation | Evaluation Manager | explicit |
| Decision | Evaluation Manager | explicit |
| Medical Examination | Insurance Doctor | explicit |
| Customer Dossier | Medical Insurance Secretary | explicit |
| Notification of Rejection | Medical Insurance Secretary | explicit |
| Issuing | Medical Insurance Secretary | explicit |
| Filing | Medical Insurance Secretary | explicit |

TABLE 7

L-Execute

| Task Name | Level | Type |
|---|---|---|
| Data Collection | Secretary | explicit |
| Evaluation | Junior Manager | explicit |
| Decision | Junior Manager | explicit |
| Medical Examination | Medical Consultant | explicit |
| Customer Dossier | Secretary | explicit |
| Notification of Rejection | Secretary | explicit |
| Issuing | Secretary | explicit |
| Filing | Secretary | explicit |

Finally, relations Force and Revoke allow the definition of instance-dependent authorizations or prohibitions. Force specifies that the next execution of a given task within a given case must be assigned to the agent specified in the relation. Note that the pair <task, case> is the primary key (as is shown in Table 1), meaning that the assignment to a task of a given case can be forced to one agent only. Forcing assignment to a specific agent is useful, for instance, to enforce the binding of duties constraint. Relation Revoke defines prohibitions for an agent to execute a given task of a given case. For this relation, the primary key is composed of all the three attributes, meaning that the authorization to execute a task of a given case may be revoked from several agents (even if they play a role authorized to execute the task). The choice of explicitly storing case-specific prohibitions, despite the closed system assumption, is motivated by the observation that case-specific prohibitions are usually a small set, and thus it is surely more convenient to store prohibitions rather than storing the complementary set (i.e., explicitly defining all authorizations for every task in every case), which would be a very large set.

Many other relations are necessary to operate a workflow in an actual implementation. In particular, the WfMS database will include information about tasks, cases, and agents. In the following, we assume the existence of a TaskInstance table that stores generic attributes related to task execution. In one embodiment, a schema for this relation is shown in a record of Table 8.

Table 8:

TaskInstance(TaskInstanceId,TaskName,Case,Executor)

Table 8 stores one tuple (record) for every task instantiation, including the task identifier, the name, the case to which the task belongs, and the executing agent. It should be appreciated that in this embodiment, there is no concern with the exact schema of TaskInstance and of other support relations of the WfMS database: analogous authorization rules can be written, depending on the actual WfMS database schema describing the workflow structures and enactment. In this example, the TaskInstance relation serves to demonstrate the applicability of an embodiment of the present invention.

Assumptions and Notation for Active Rules

It is appreciated that very few assumptions about active rules are needed. Therefore, this embodiment of the present invention is implementable on top of most commercial products and research prototypes of active databases such as those described, e.g., in Widom, J., et al., "Active Database Systems." Morgan-Kaufmann, San Mateo, Calif., August 1996, and also in Paton, N. W., et al., "Dimensions of active behavior," in N. W. Paton and M. H. Williams, editors, Proceedings of First Workshop on Rules in Database Systems, WICS, Scotland, August, 1993, Springer-Verlag, Berlin. For ease of specification, relational model and high-level, catalog-like active rules are adopted. An analogous approach can be devised for object-oriented databases and object-oriented rule languages, and indeed in Section 5, we will show an object-oriented implementation of our approach within the WIDE WfMS.

It is assumed that rules follow the ECA (event-condition-action) paradigm, that is, they are triggered by specific events, include a declarative condition and a sequence of procedural actions. In one embodiment, a simple notation for active rules, such as one which is described in Baralis, E., et al., "An algebraic approach to rule analysis in expert database systems," in Proceedings of the 20th International conference on Very Large Data Bases (VLDB'94), Santiago, Chile, September, 1994.

In one embodiment, those rules have the following syntax:

```
rule < rule-name >
    when < events >
    if   < condition >
    then < action >
```

The event part contains a list of events, which are restricted to instant or periodic temporal events, insertions, deletions, and qualified updates (on specific attributes).

The condition part contains a Boolean expression of predicates. Predicates can be either simple comparisons between terms (variables or constants), or database predicates with the usual Datalog interpretation, such as one described in Ullman, J. D., "Principles of Database and Knowledge-Base Systems," Computer Science Press, 1989, in two volumes. Further, the special predicates inserted, updated, and deleted unify with newly inserted and deleted tuples.

The action part contains a sequence of commands. Bindings are passed from conditions to actions by means of shared variables (denoted by capital letters): variables in the action are bound to the values that are computed for them by the condition. Bindings are not changed by the actions' evaluation, which consists of a sequence of set-oriented primitives.

A rule is triggered when one of its associated events occurs. Rule processing is started whenever a rule is triggered, and consists in the iteration of rule selection and rule execution.

Rule selection may be influenced by static, explicitly assigned priorities: whenever two or more rules are triggered, the one with the highest priority is executed (ordering among rules with the same priority is non-deterministic). When a rule is selected, it is also detriggered.

Rule execution consists of evaluating the condition and next executing the action only if the condition is true. Action execution may cause events and therefore trigger other rules.

It is assumed that rule processing initiates immediately after events are detected, and terminates when all triggered rules have been executed. We assume that the rate at which events are generated is lower than the actual rate at which events are processed, thus avoiding backlogs.

Otherwise, the logs grow indefinitely. However, this is a realistic assumption, since organizational changes happen at a low rate with respect to the speed of the system in processing rules.

ECA (event-condition-action) rules for authorization constraint enforcement

As described above, active rules are used as a suitable paradigm for modeling and enforcing authorization constraints. Further, examples of such rules, for the above described different constraint categories are described below. Rule examples are defined for the workflow schema 300 shown in FIG. 3. In particular, examples of constraints, e.g., binding of duties, separation of duties, and restricted task execution are provided.

EXAMPLE 1

Binding of Duties

This rule enforces the bindingofduties constraint for agents between tasks Data-collection and issuing.

The constraint is triggered as an agent pulls a task (e.g., starts executing), since in that instant all the bindingofduties constraints involving the pulled task become "defined", meaning that it is known who the executing agent is. It is assumed that pulling a task corresponds, from a database perspective, to the update of attribute executor in a tuple of relation taskinstance. The value of attribute executor is initially set to NULL, until the task is pulled by an agent for execution.

In the condition part, the rule identifies the executor of the data-collection task and the involved case and task instance, while the action part inserts a tuple (record) in the database that specifies that task issuing must be assigned to the agent who executed task data-collection in the same case.

The definition rule is as follows:

```
rule    BindingOfDuties
when    updated(TaskInstance.Executor)
if      updated[TaskInstance(-,"Data\_Collection",CASE,AGENT)]
then    insert[Force("Issuing",CASE,AGENT)]
```

EXAMPLE 2

Separation of Duties

This rule enforces the separationofduties constraint between tasks Evaluation and Decision.

It is triggered as a task is pulled by an agent: once it is known who the executor of a task evaluation is, the rule can revoke to him/her/it the permission to execute task decision in the same case. The semantics of the condition part is analogous to that of the previous rule.

The separation rule is as follows:

```
rule    separationOfDuties
when    updated(TaskInstance.Executor)
if      updated[TaskInstance(-,"Evaluation",CASE,AGENT)]
then    insert[Revoke("Decision",CASE,AGENT)]
```

EXAMPLE 3

Restricted Task Execution

This example shows a rule (actually a pair of rules) enforcing the time-dependent (also called absolute time) constraint restrictedtaskexecution.

The first rule grants the permission to all agents playing role secretary to start executing task filing every day at 8 a.m. The second rule revokes the same permission every day at 6 p.m. It should be appreciated that, unlike the previous example, these rules define a case-independent constraint, which holds for every instance of the Medical Insurance schema in workflow 300 of FIG. 3.

The restricted task rule is as follows:

```
rule    temporalGrant
when    @08:00
if      true
```

```
then    insert[R-Execute("Filing","Secretary","explicit")]
rule    temporalRevoke
when    @18:00
if      true
then    delete[R-Execute("Filing","Secretary","explicit")]
```

ECA rules for authorization management

One of the key concepts in an embodiment of the present invention is the notion of derived authorization in the role/level hierarchies, as defined above, by Rule 1 (R1) and Rule 2 (R2). If the workflow administrator authorizes a role/level to execute a given task T, then a derived authorization to execute T is implicitly defined for its ancestors in the role or level hierarchy.

It should be appreciated that rules can be defined for descendants instead of ancestors, if that is the required semantics. The semantics described here is the most commonly adopted in workflow management. In addition, it is possible to specify that a task should only be assigned based on explicit authorization, regardless of the roles and levels hierarchies. For example, an execute authorization granted to role insurance doctor for a given task caused the same authorization to be derived for role insurance WF responsible.

The following defines a set of active rules, operating on the authorization base previously defined, that specifies the operational semantics of the derivation mechanism. Rules are activated as explicit authorizations which are granted or revoked (corresponding, from a database perspective, to insertions or deletions on the authorization tables), and compute derived authorizations.

Rules that manage insertions of new execute authorizations for roles and levels are shown below, in one embodiment of the present invention.

```
rule    deriveRoleAuthorization
        when    inserted(R-Execute)
        if      inserted[R-Execute(TASK,ROLE,-)]
                RoleHierarchy(ROLE,PARENT)
                not (R-Execute(TASK,PARENT,"derived"))
        then    insert[R-Execute(TASK,PARENT,"derived")]
rule    deriveLevelAuthorization
        when    inserted(L-Execute)
        if      inserted[L-Execute(TASK,LEVEL,-)]
                LevelHierarchy(LEVEL,PARENT)
                not (L-Execute(TASK,PARENT,"derived"))
        then    insert[L-Execute(TASK,PARENT,"derived")]
```

The rules are analogous for roles and levels. Rule derivelevelauthorization operates analogous to rule deriveroleauthorization. As a new (explicit or derived) authorization is granted to a level (event inserted(L-Execute)), the condition finds the parent levels for which the authorization has been defined (predicate inserted[L-Execute(TASK,LEVEL,-)], LevelHierarchy(LEVEL,PARENT)), and verifies that a derived authorization has not already been granted for the same task (predicate not (L-Execute(TASK, PARENT,"derived")), in order to propagate it to the parents. If the condition is verified, the action part is executed, inserting the authorization into the L-Execute table (action insert[L-Execute(TASK,PARENT,"derived")]).

It should be appreciated that the condition (and the primary key of relations R-Execute and L-Execute) ensures that only one explicit and one derived authorization are defined for a given <task,role> or <task,level> pair, in order to avoid redundancy. It should be further appreciated that the action part re-triggers the same rule, thereby iterating the derivation process. Triggering terminates either when all parents of the newly authorized role or level are already authorized to execute the task, or when the derived authorization is granted to the root of the hierarchy.

Rules managing deletions of derived authorizations, deleteroleauthorization and deletelevelauthorization, are described below.

```
Rule:   deleteRoleAuthorization
        when    deleted(R-Execute)
        if      deleted[R-Execute(TASK,ROLE,-)]
                RoleHierarchy(ROLE,PARENT)
                not (RoleHierarchy(SIBLING,PARENT)
                R-Execute(TASK,SIBLING,-))
        then    delete[R-Execute(TASK,PARENT,"derived")]
Rule:   deleteLevelAuthorization
        when    deleted(L-Execute)
        if      deleted[L-Execute(TASK,LEVEL,-)]
                LevelHierarchy(LEVEL,PARENT)
                not (LevelHierarchy(SIBLING,PARENT)
                L-Execute(TASK,SIBLING))
        then    delete[L-Execute(TASK,PARENT,"derived")]
```

The semantics of rule deletelevelauthorization is as follows: the rule is triggered by a revocation of an explicit or derived authorization related to a given <TASK,LEVEL> pair. The condition part determines whether derived authorizations to execute TASK should be revoked to its parents as well. A derived authorization is revoked to a given level only if none of its descendants holds an authorization to execute the same task. Thus, the condition verifies that no immediate descendant has authorization (not (LevelHierarchy(SIBLING,PARENT),L-Execute(TASK,SIBLING,-))) and, if so, the action part revokes the authorization to the parents. It should be appreciated that there is no need of checking all the descendants. The derivation mechanism ensures that if a given level or role does not have a derived authorization, then neither will any of its descendants.

It should further be appreciated that if a explicit authorization was granted to PARENT, it still holds, that is, the parent is still authorized to execute the task. The adoption of these semantics is explained by the following example: suppose that an execute authorization is explicitly granted to level secretary (509 of FIG. 5B) and an execute authorization for the same task is also explicitly granted to level junior manager ( 505 of FIG. 5B): the adopted semantics guarantees that if we revoke the authorizations to level secretary, the junior manager still has the authorization to execute the task.

Accordingly, derived authorizations are computed in advance, and are stored in the authorization base. Although this implies the need for a larger storage space, it provides two significant advantages. First is a reduction in computational overhead; such that derivations have to be computed when explicit authorizations are modified rather than each time a task is activated. We expect modifications of authorizations to be significantly less frequent than task activations. Second is a reduced delay between task scheduling and assignment; such that all authorizations are pre-computed and a simple query determines the set of agents allowed to execute the task.

Assigning Tasks to Agents

Active rules can be used to modify the authorization tables R-Play, R-Execute, L-Play, L-Execute, Revoke, and Force, so that the WfMS can always determine the set of agents authorized to execute a task of a given case. Also shown are how tasks are assigned to agents.

It is first observed that the authorization base can be divided into a case-independent part and a case-specific part. The case-independent part is composed of relations R-Play, R-Execute, L-Play, and L-Execute. These relations enable the maintenance of two case-independent views: one for tasks that must be assigned only based on explicit authorizations, and one for tasks to be assigned based on derived authorizations. The views are called case-indepexecutorexplicit and case-indepexecutorderived. The views are defined as follows:

```
Case-indepExecutorExplict (TASKNAME,AGENT):-
    R-Play(AGENT,ROLE),
    R-Execute(TASK,ROLE, "explicit"),
    L-Play(AGENT,LEVEL),
    L-Execute(TASK,LEVEL, "explicit")
Case-indepExecutorDerived (TASKNAME,AGENT):-
    R-Play(AGENT,ROLE),
    R-Execute(TASK,ROLE,-),
    L-Play(AGENT,LEVEL),
    L-Execute(TASK,LEVEL,-)
```

Since the view is case-independent, it requires a reduced storage space. Therefore, for the same motivations stated above, the view should be materialized, to achieve better system performance at the cost of a (relatively small) increase in the storage space. View materialization can also be performed by means of active rules. The derivation of active rules for materialized view maintenance has been discussed in several papers, such as the one described in Ceri, S., et al., "Deriving production rules for incremental view maintenence," in Proceeeding of the 17th International Conference on Very Large Data Bases (VLDB'91), Lecture Notes in computer science, Springer Verlag, pages 577–589, Barcelona, Spain, August 1991, Springer-Verlag, 1991.

A description of how the set of agents authorized to execute a task is determined follows. Consistent with the approach regarding descriptions of embodiments of the present invention, the semantics will be defined in terms of active rules. It is assumed that the activation of a new task corresponds, from a database perspective, to the insertion of a new tuple in the taskinstance table. As the new tuple is inserted, the authorized agents are determined; a set of active rules, triggered by the insertion in the taskinstance table, examines the contents of tables force and revoke, as well as the content of view case-indepexecutor, and fills in table authorized(TaskInstanceId,Agent), that defines the agents authorized to execute the newly activated instance. It should be appreciated that it is assumed that the task instance identifier taskinstanceId is unique within a given WfMS domain, otherwise the case identifier must be included among the attributes of this relation.

Insertions in the Authorized table are managed by two rules, authorizeforcedagents and authorizeagents.

Rule authorizeforcedagents checks whether the task must be assigned to a specific agent due, for instance, to a binding of duties authorization constraint. The rule, in the condition part, checks that an entry in the force table exists for the task in the case under consideration, and that the authorization has not been revoked. If the condition holds, then the action part inserts a tuple (record) in the Authorized table, in order to notify that the agent involved is authorized to execute the task for that case.

The rule for authorizeforcedagents is defined as follows:

```
Rule    authorizeforcedagents
        when  inserted(TaskInstance)
        if    inserted[TaskInstance(TASKID,TASKNAME,CASE,-)]
              Force(TASKNAME,CASE,AGENT),
              not(Revoked(TASKNAME,CASE,AGENT))
              Case-indepExecutor(TASKNAME,AGENT)
        then  insert[Authorized(TASKID,AGENT)]
```

As detailed in the definition of table force, only one agent can be forced as the executor of a task. Hence, only one tuple is inserted. It should be appreciated that it is possible that the authorization, possibly due to erroneous or conflicting authorization constraints, has been revoked, or even that it was never granted (this is checked by predicate not(Revoked (TASKNAME,CASE,AGENT), Case-indepExecutor (TASKNAME,AGENT)). In this case, no entry is made in the Authorized Table.

It should also be appreciated that embodiments of the present invention are not concerned with system policies that define the appropriate behavior when no authorized agent exists. This is an exceptional situation, and is expected to be managed by the workflow engine, for instance, by sending a message to the responsible person asking him/her/it to suggest the appropriate executing agent.

Rule authorizeagents which determines the authorized agents in case no agent has been forced is now described. The authorizeagents rule first considers case independent authorizations (predicate Case-indepExecutor (TASKNAME,AGENT)), and then restricts the set to those agents to whom the permission has not been revoked for the case under consideration (predicate not(Revoked (TASKNAME, CASE,AGENT))). Finally, the condition checks that no forced agent has been defined for the task in this specific case (predicate not(Force (TASKNAME, CASE,-))). If the condition holds, then the action part inserts one or more tuples in the Authorized table, defining the agents authorized to execute the newly activated instance.

```
Rule    authorizeAgents
        when  inserted(TaskInstance)
        if    inserted[TaskInstance(TASKID,TASKNAME,CASE,-)],
              Case-indepExecutor(TASKNAME,AGENT)
              not (Revoked(TASKNAME,CASE,AGENT)),
              not(Force(TASKNAME,CASE,-))
        then  insert[Authorized(TASKID,AGENT)]
```

Once the set of authorized agents has been determined, the WfMS must select the agents to which the task is assigned for execution, for example, inserted in the corresponding worklists. In one embodiment, the approach consists in assigning the task to all authorized agents. While this solution is feasible and does not violate any authorization constraint, it is impractical, since the worklists of high-level employees would be quickly filled-up. An alternative, and more reasonable policy, consists in first trying to assign tasks to authorized agents placed in the lower positions of the role/level hierarchies. If none of these agents is available, then tasks are assigned to agents placed in higher positions. Numerous other policies are possible, such as assigning tasks depending on the agents' workload, following a "round-robin" approach, or selecting a "dispatching agent" that will assign the task to a suitable agent. It should be appreciated that the definition of these policies is outside the scope of the present invention, since other policies may not be concerned with authorization constraints, provided that agents are selected from among those authorized.

It is observed that rules may be also adopted in order to handle exceptional situations related to task assignment to agents. One example of an exceptional situation is a modification of authorizations to execute a given task occurring after the task has been scheduled. Another example would be when the task is already in execution. Suitable rules, such as those described in Casati, F., et al., "Using patterns to design rules in workflows," Technical Report 97.065, Dipartimento di Elettronica e Informazione, Politecnico di Milano, 1997 and also described in Castano, S., et al., "Rules and patterns for security in workflow systems," in Proceedings of the 12th IFIP TC/11WG11.3 International conference on Database Security, Chalchidiki, Greece, July 1988, Kluwer Academic Publishers, can detect the exceptional event and possibly notify the WfMS that the task needs to be reassigned to a different agent.

Implementation of Embodiments of the Present Invention in a Wide Workflow Management System.

An implementation of authorization constraints and derivation rules within the WIDE (workflow on intelligent distributed database environment) WfMS (workflow management system) is described.

The WIDE (workflow on intelligent distributed database environment) workflow management system provides a process model that, in addition to the traditional modeling constructs for specifying workflow schemas, allows the definition of triggers (also called rules in the following). WIDE triggers conform to the ECA (event-condition-action) paradigm. WIDE triggers are specified in a language, Chimera-Exc, which is derived from the object-oriented database language Chimera, as described in Ceri, S. et al., "Rules in database systems," ACM Computing Surveys, 28(1): 109–111, March 1996.

The derived language, Chimera-Exc, is described in Casati, F., et al., "Specification and Implementation of Exceptions in Workflow Management Systems," Technical Report 98.081, Dipartimento di Elettronica e Informazione, Politecnico di Milano, July 1998, and also in Casati, F., et al., "An Environment for Designing Exception in Workflows," in Proceedings of the 10th International Conference on Advanced Information Systems Engineering (CAiSE'98), Lecture Notes in Computer Science, Springer Verlag, Pisa, Italy, June 1998, Springer-Verlag, Berlin.

Triggers are a fundamental complement to the graph-based representation of a business process (typical of most conceptual workflow models and of WIDE), since they allow the workflow administrator to model and react to several types of synchronous and asynchronous events that may occur in a workflow execution.

In one embodiment, Chimera-Exc triggers react to various events, e.g., data events, external events, workflow events, and temporal events.

Data events correspond to updates to system or workflow relevant data. They may correspond to a constraint violation, to a task or case cancellation, or to the unavailability of an agent.

External events are user defined, application-specific, (such as a document arrival, a telephone call, an incoming e-mail), and are explicitly raised by external applications.

Workflow events are raised as a case or task is started or completed. They are expressed through predefined events such as casestart, caseend, taskstart(taskname), and taskend (taskname).

Temporal events are expressed as deadlines, time elapsed since a certain instant, or cyclic periods of time.

Each rule in Chimera-Exc can monitor multiple events, with a disjunctive semantics: the rule is triggered if any of its triggering events occurs.

The condition part of a rule is a predicate on system and workflow relevant data at the time of the condition evaluation, which indicates whether the event must be managed. Chimera-Exc requires that the object-oriented schema upon which rules execute is logically defined. Chimera-Exc rules access three types of classes: WIDE classes, workflow—specific classes, and event handling classes.

WIDE classes include descriptions of agents, roles, tasks, and cases. These classes are workflow-independent, and are predefined in the system; objects are created when new roles, agents, tasks or cases are created. For instance, Chimera-Exc rules may refer to WIDE attributes concerning tasks by accessing the attributes of the class task, which has a workflow-independent structure. An object of this class is created whenever a new task is instantiated (independently on the workflow schema it belongs to); hence, the executor of a case can be accessed by defining a variable T ranging upon the task class, and then by accessing T.executor. For instance, (task(T), agent(A), T.executor=A, A.name="Judy") selects the tasks whose executor is Judy.

Workflow-specific classes store workflow relevant data. Each case will be represented as an object within this class, created when the case is started.

Event handling classes store information carried by occurred events. For instance, the externalevent class is referenced in order to access the parameters of an occurred external event.

A condition is a query that inspects the contents of the WIDE database. Queries consists of a formula evaluated against the state of the database and of a list of variables, with which a set of bindings is assigned by the evaluation of the formula. Conditions include class formulas (for declaring variables ranging over the current extent of a class, e.g., medicalInsurance(C)); C in this case ranges over object identifiers of the medicalInsurance class), type formulas (for introducing variables of a given type, e.g., integer(I)), and comparison formulas, which use binary comparison between expressions (e.g., T.executor="Mark"). Terms in the expressions are attribute terms (e.g., C.examNeeded ) or constants. The predicate occurred, followed by an event specification, binds a variable defined on a given class to object identifiers of that class which were affected by the event. For instance, in agent(A), occurred(create(agent), A), A is bound to an object of the agent class that has been created. If the result of a query is empty (for example, no bindings are produced), then the condition is not satisfied and the action part is not executed. Otherwise, bindings resulting from the formula evaluation are passed to the action part in order to perform the reaction over the appropriate objects.

The action (or reaction) part of a rule may consist of calls to the WfMS, requiring a particular service, or manipulation of workflow data, e.g., object creation, modification, or deletion. Calls to the WfMS may request to activate or terminate cases or tasks, to reassign a task to a different agent, or to send notification messages to workflow agents.

Rules in WIDE are defined either in the context of a specific workflow or as global rules. In the first case, specific workflow, rules are targeted to a workflow, and their side effects are propagated only to the cases and tasks of that workflow. In the second case, global (untargeted) triggers may be used for generic authorization policies, shared by all schemas, while targeted triggers define authorization constraints for a given schema.

Rule Execution

In one embodiment, Chimera-Exc rules are executed by a system called FAR (foro active rules), integrated with the WIDE engine, called FORO. The FAR system executes Chimera-Exc triggers in detached mode, for example, in a separate transaction with respect to the triggering one. This choice has several motivations: Chimera-Exc actions are outside the database context, and cannot be rolled back. Therefore, it must be ensured that the triggering event actually occurred before processing it, which means that the triggering transaction must commit. Furthermore, the use of detached mode allows managing of data events in a uniform way with respect to the other event types, and provides considerable advantages in the performance, allowing the processing of several events generated by different transactions with the execution of a single rule. The semantic and performance issues that advised the use of a detached execution mode are described in Casati, F., et al., "Specification and Implementation of Exceptions in Workflow Management Systems," Technical Report 98.081, Dipartimento di Elettronica e Informazione, Politecnico di Milano, July 1998. This feature is relevant to authorization management since it influences the approach towards the development of WIDE derivation rules.

The FAR system is engineered in order to be easily portable to different database platforms. This is a fundamental requirement for a commercial WfMS, that typically needs to be able to execute within heterogeneous environments. When a FAR runs on top of relational DBMSs (database management system), the authorization base, along with the entire WIDE database, is stored in relational tables. A suitable SQL2 Chimera application translates the relational definitions in Chimera classes. The relational DBMS is the accessed through a layer that maps Chimera conditions into SQL queries, thereby enabling the portability of WIDE onto different (relational) databases. This is also the case of the current implementation, which runs on top of the Oracle database server, version 7.3. FAR also makes a very limited use of database specific features, so that it can be ported to other relational or object-oriented platforms with a reduced effort.

WIDE Authorization Database

The set of WIDE classes is extended in order to enable the implementation of the authorization mechanism as defined previously in the portion of the disclosure describing authorization constraints. The WIDE prototype already included classes agent and role, whose objects store basic information about agents and roles, such as the agent's names. location, vacation period, and role's names and descriptions. Added are a class level, analogous to class role, and additional classes which enable the implementation of role and level hierarchies and the definition of play and execute authorizations. These classes are the object-oriented counterpart of the relations defined in authorization section above, and are shown in FIG. 6.

Authorization Constraint Enforcement in WIDE

Although WIDE triggers were initially conceived for modeling exceptional situations that may occur during process execution, (as described in Casati99, cited above), the capability of capturing and reacting to several types of events and the rich expressive power of the condition and action language make them an appropriate construct for modeling and managing authorization constraints.

Since the expressive power of Chimera-Exc includes that of the datalog-like rules as defined in schema of the authorization base section, and given that the authorization base of WIDE has the same structure of the one defined in that same section regarding the schema of the authorization base, a possible implementation consists in mapping each rule as described in the section pertaining to ECA rules for authorization constraint enforcement with a Chimera-Exc rule that implements the same semantics: relational operations (insert, update, delete) are mapped into their corresponding Chimera-Exc object-oriented operation (i.e., create, modify, delete), and Datalog conditions are replaced by Chimera-Exc predicates. For instance, rule bindingofduties of the section regarding ECA rules can be implemented in Chimera-Exc by means of the following trigger:

```
define   trigger      bindingOfDuties
         events       modify(task.executor)
         condition    task(T), occurred(modify(task.executor), T),
                      T.name="Data_Collection"
         actions      create(force[(taskName:"Issuing",caseId=T.caseId,
                      agentId=T.executor], F)
```

However, WIDE users are not allowed to define rules that directly (i.e., within the rule's action) update the content of system data, since erroneously defined rules could harm the integrity of the system. Thus, rules notify the workflow engine of the actions to be performed, and the engine then performs these actions when appropriate. Therefore, consistently with this approach, rules modeling and managing authorization constraints do not directly modify the authorization base, but rather notify the engine concerning the new authorizations or prohibitions.

```
Class definitions of the WIDE authorization base define object class roleHierarchy
    attributes roleId: role, parentId:role
    constraints key (R:roleId, P:parentId)
end
define object class levelHierarchy
    attributes levelId: level, parentId:level
    constraints key (L:levelId, P:parentId)
end
define object class r-Play
    attributes agentId: agent, roleId: role
    constraints key (A:agentId, R:roleId)
end
define object class l-Play
    attributes agentId: agent, levelId: level
    constraints key (A:agentId, L:levelId)
end
define object class r-Execute
    attributes taskName: string, roleId: role, type: string
    constraints key (T:taskName, R:roleId, P:type)
end
define object class l-Execute
    attributes taskName: string, levelId: level, type: string
    constraints key (T:taskName, L:levelId, P:type)
end
define object class force
    attributes taskName: string, caseId: case, agentId: agent
    constraints key (T:taskName, C:caseId)
end
define object class revoke
    attributes taskName: string, caseId: case, agentId: agent
    constraints key (T:taskName, C:caseId, A:agentId)
end
```

In order to enable the definition of triggers modeling and enforcing authorization constraints, we have extended Chimera-Exc actions by adding several WfMS calls: r-Play, r-Execute, l-Play, l-Execute, revoke, and force. Primitives r-Play and l-Play enable the modification of play authorizations for roles and levels. They both have three parameters: the role/level, the agent involved in the authorization, and a binary value that defines whether the case-independent authorization is to be granted or revoked (allowed values are grant or revoke). Similarly, r-Execute and l-Execute enable the definition of execute authorizations, and also have three parameters: the role/level, the task involved in the authorization, and a parameter that defines whether the case-independent authorization is to be granted or revoked.

Primitives revoke and force enable the modification of case-specific authorizations. The revoke primitive revokes to an agent the authorization to execute a given task in a given case, while force constrains the WfMS to assign a task of a given case to the specified agent. Both primitives contain three parameters: the name of the agent, the name of the task, and the case identifier. For instance, referring to the workflow schema of FIG. 3, the call revoke("Judy","Issuing",medicalInsurance) (508 of FIG. 5A) revokes Judy's permission to execute task Issuing in case 308 of the Medical Insurance process 300.

For instance, the binding of duties constraint can be enforced by the following Chimera-Exc trigger:

EXAMPLE 1

Binding of Duties

| define | trigger | bindingOfDuties for medicalInsurance |
|---|---|---|
|  | events | modify(Task.executor) |
|  | condition | task(T), occurred(modify(task.executor), T), T.name="Data_Collection" |
|  | actions | force(T.executor,"Issuing",T.caseId) |

EXAMPLE 2

Separation of Duties

| define | trigger | separationOfDuties for medicalInsurance |
|---|---|---|
|  | events | modify(Task.executor) |
|  | condition | task(T), occurred(modify(task.executor), T), T.name="Evaluation" |
|  | actions | revoke(T.executor,"Decision",T.caseId) |

EXAMPLE 3

Restricted Task Execution

| define | trigger | temporalGrant for medicalInsurance |
|---|---|---|
|  | events | 8/hours during days |
|  | condition | true |
|  | actions | r-Execute("Secretary","Filing",grant) |
| define | trigger | temporalRevoke for medicalInsurance |
|  | events | 18/hours during days |
|  | condition | true |
|  | actions | r-Execute("Secretary","Filing",revoke) |

Derivation Triggers in WIDE

Unlike triggers defining and enforcing authorization constraints, derivation triggers are global and predefined. Derivation triggers are not visible to a user, and their purpose is to implement the derivation mechanism. This allows defining rules that directly modify the database state. Furthermore, in order to enforce the semantics defined in the section describing active rule support, derivation triggers need to be triggered immediately as an explicit authorization is granted or revoked, within the context of the same transaction, otherwise another transaction could see a database state in which an authorization is defined for a role/level but not for their ancestors.

Chimera-Exc rules are executed periodically, and are detached. Therefore, they are not suited for the implementation of derivation rules. In WIDE, used instead are native immediate Oracle triggers, which are defined in the WIDE database as the system is installed. The implementation of WIDE onto different database platforms will require the modification of these triggers; however, we only exploit basic active functionality, so that similar triggers are implementable, with minor changes, on most commercial database systems, consistently with the requirements and objectives of the WIDE project.

The derivation triggers defined in Oracle are analogous to those defined in the section describing ECA rules for authorization management. In the following, as an example, we show how rule deriveroleauthorization, of ECA rules for authorization management, is implemented as an Oracle trigger. With respect to the corresponding datalog-like rule, the Oracle trigger does not check previous existence of the tuple it is inserting (if a tuple is pre-existent, the insertion is rejected), and the value derived in the type attribute is implicitly added as default value, so there is no need to explicitly define it in the action part of the rule.

```
CREATE TRIGGER deriveRoleAuthorization
    AFTER INSERT ON r-Execute
    FOR EACH ROW
    INSERT INTO r-Execute (taskName, roleId)
    select distinct r-Execute.taskName, roleHierarchy.parentId
    from r-Execute, roleHierarchy
    where r-Execute.taskName=:new.taskName AND
    roleHierarchy.roleId=:new.roleId
```

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of assigning resources to nodes in a workflow comprising:
    defining a plurality of nodes, wherein said nodes are tasks to be executed within said workflow;
    defining said resources for execution of said nodes;
    storing a set of data items having variables pertaining to execution of said workflow; and assigning said resources to said nodes for execution thereof in accordance with a set of rules, said set of rules for controlling the execution of said workflow, wherein each rule of said set of rules specifies an event, a condition, and an action, wherein pre-computed authorizations are applied to said resources and wherein said authorizations are maintained in an up-to-date-manner, such that a set of authorized resources is retrievable concurrent with an initiated task.

2. The method as recited in claim 1 wherein said rules are based in accordance with an execution history of said workflow.

3. The method as recited in claim 1 wherein said rules are based in accordance with said set of data items.

4. The method as recited in claim 1 wherein said rules are based in accordance with time, wherein said time is relative to the execution of said nodes, and wherein said time is relative to the execution of said workflow, and wherein said time is relative to absolute time.

5. The method as recite in claim 1 wherein said rules are based in accordance with time.

6. The method as recited in claim 1 wherein said rules are defined in accordance with a common language used for the entire workflow and used for assigning said resources to said nodes.

7. The method as recited in claim 1 wherein said resources executing said nodes are agents.

8. The method as recited in claim 1 wherein said rules are Boolean expressions.

9. A computer system in a computer system network, said computer system comprising:
a bus;
a memory unit coupled to said bus;
a processor coupled to said bus, said processor for executing a method of assigning resources to nodes in a workflow, said method comprising:
defining a plurality of nodes, wherein said nodes are tasks to be executed within said workflow;
defining said resources for execution of said nodes;
storing a set of data items having variables pertaining to execution of said workflow; and
assigning said resources to said nodes for execution thereof in accordance with a set of rules, said set of rules for controlling the execution of said workflow, wherein each rule of said set of rules specifies an event, a condition, and an action,
wherein said resources further comprise pre-computed authorizations, and wherein said authorizations are maintained in an up-to-date-manner, such that a set of authorized resources is retrievable concurrent with an initiated task.

10. The computer system of claim 9 wherein said rules of said method of assigning resources to nodes in a workflow are based in accordance with an execution history of said workflow.

11. The computer system of claim 9 wherein said rules of said method of assigning resources to nodes in a workflow are based in accordance with said set of data items.

12. The computer system of claim 9 wherein said rules of said method of assigning resources to nodes in a workflow are based in accordance with time, wherein said time is relative to the execution of said nodes, and wherein said time is relative to the execution of said workflow, and wherein said time is relative to absolute time.

13. The computer system of claim 9 wherein said rules of said method of assigning resources to nodes in a workflow are based in accordance with a common language used for the entire workflow.

14. The computer system of claim 9 wherein said rules of said method of assigning resources to nodes in a workflow are based in accordance with a common language used for the entire workflow and used for assigning said resources to said nodes.

15. The computer system of claim 9 wherein said resources executing said nodes are agents.

16. The computer system of claim 9 wherein said rules of said method of assigning resources to nodes within a workflow are Boolean expressions.

17. A computer readable medium for storing computer implemented instructions, said instructions for causing a computer system to perform:
defining a plurality of nodes, wherein said nodes are tasks to be executed within said workflow;
defining said resources for execution of said nodes;
storing a set of data items having variables pertaining to execution of said workflow; and
assigning said resources to said nodes for execution thereof in accordance with a set of rules, said set of rules for controlling the execution of said workflow, wherein each rule of said set of rules specifies an event, a condition, and an action,
wherein said resources further comprise pre-computed authorizations, and wherein said authorizations are maintained in an up-to-date-manner, such that a set of authorized resources is retrievable concurrent with an initiated task.

18. The computer readable medium of claim 17 wherein said rules are based in accordance with an execution history of said workflow.

19. The computer readable medium of claim 17 wherein said rules are based in accordance with said set of data items.

20. The computer readable medium of claim 17 wherein said rules are based in accordance with time, wherein said time is relative to the execution of said nodes, and wherein said time is relative to the execution of said workflow, and wherein said time is relative to absolute time.

21. The computer readable medium of claim 17 wherein said rules are based in accordance with time, wherein said time is relative to the execution of said nodes.

22. The computer readable medium of claim 17 wherein said rules are based in accordance with a common language used for the entire workflow and used for assigning said resources to said nodes.

23. The computer readable medium of claim 17 wherein said resources executing said nodes are agents.

24. The computer readable medium of claim 17 wherein said rules are Boolean expressions.

* * * * *

UNITED STATES PATENT AND TRADEMARK OFFICE
CERTIFICATE OF CORRECTION

PATENT NO. : 7,155,720 B2  Page 1 of 1
APPLICATION NO. : 10/032893
DATED : December 26, 2006
INVENTOR(S) : Fabio Casati et al.

It is certified that error appears in the above-identified patent and that said Letters Patent is hereby corrected as shown below:

In column 8, line 56, delete "I, I'ϵL, I' holds if I precedes I'in" and insert -- 1, l'ϵL, l' holds if 1 precedes l' in --, therefor.

In column 27, line 21, in Claim 5, delete "recite" and insert -- recited --, therefor.

Signed and Sealed this

Twenty-eighth Day of April, 2009

JOHN DOLL
*Acting Director of the United States Patent and Trademark Office*